Oct. 8, 1929.    N. M. KNUDSEN    1,730,736
HOT WATER SYSTEM
Filed Feb. 21, 1927    2 Sheets-Sheet 1

Inventor:
Neils M. Knudsen.
by Wright, Brown, Quinby & May
Att'ys.

Patented Oct. 8, 1929

1,730,736

UNITED STATES PATENT OFFICE

NEILS M. KNUDSEN, OF PORTLAND, MAINE

HOT-WATER SYSTEM

Application filed February 21, 1927. Serial No. 169,706.

The present invention relates to water systems designed to provide hot water for washing and other purposes, that is, purposes which require drawing of water from the system.

The object of the invention is to maintain a circulation of water throughout the system to the end that a high temperature may be constantly maintained in the water at or near the faucets or taps from which it is drawn, thus avoiding waste of a considerable quantity of cold or lukewarm water before hot water appears at the opened tap, and to do so with minimum expenditure of heat by the heating agent. The invention consists in a new combination of water circulating medium and heating apparatus, of which the principles may be embodied in many diverse forms, and one possible form is explained in the following detailed description.

In the drawings,—

Like reference characters designate the same parts wherever they occur in all the figures.

Figure 1:
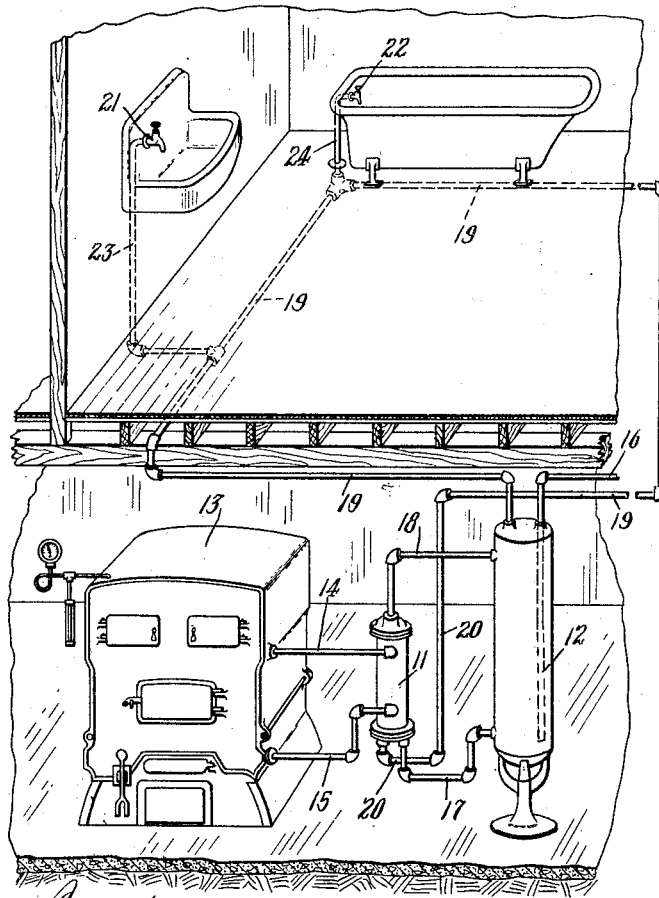
Fig. 1 is a perspective view illustrating in a simple and somewhat diagrammatic way the application of the invention to a hot water supply system for domestic use.

Referring first to the diagrammatic view in Fig. 1, 11 represents a water heater, 12 represents a storage tank for water in the hot water supply system, and 13 represents a source of heat, in this case the steam or hot water boiler or furnace of a steam or hot water heating system for the building in which the water supply system is installed. Hot water from the water space of this furnace or boiler as the heating agent flows by a pipe 14 to the heater 11 and returns therefrom by a pipe
15 to the boiler.

The cold water to be heated enters the hot water supply system by a pipe 16 which leads into the tank and discharges in the lower part thereof. A pipe 17 conducts water from the lower part of the tank to the heater, wherein it is heated by thermal contact, but without mixing with the heating agent, and a pipe 18 conducts the heated water to the upper part of the tank. Hence pipe 18 provides the flow connection from heater to tank and pipe 17 the return connection from tank to heater. Heated water is taken thence to supply the faucets or other water supply outlets throughout the building, by means of a pipe line 19 which, possibly with branches and parallel connected pipe lines, leads throughout the circuit of the building or of so much of the building as is needed to supply the outlets, and terminates in a return pipe 20 which leads back to the heater, through a different entrance from that to which water is conducted by the pipe 17.

It will be evident that so long as heat is supplied to the heater 11, water is circulated by the thermal effect so created, through two paths, one of them being the pipe 18, tank 12 and pipe 17, and the other being pipe 18, circuit pipe 19, and parallel circuits, if any, and return pipe 20. As the pipes 18 and 19 both enter the tank 12, they are in effect connected together, and they, together with the return pipe 20 and heater 11, furnish a complete circulating system through which water will be continuously circulated by the effect of heat delivered to the water in the heater 11.

Where duplications or repetitions of such circulating pipe occur, they provide parallel or shunt channels through which also the water is circulated. The taps or outlets 21, 22, etc. are supplied by branch pipes 23, 24, leading from the circuit pipe 19, or a duplicate or equivalent of such pipe. By reason of the water circulation thus effected, the water is kept hot up to the points at which the branch pipes 23, 24, and the like, are joined to the circulating pipe, wherefore hot water is immediately available at the point of use as soon as the contents of the short branch pipe have run off, and so with a minimum waste of water. That is, it is not necessary to draw off the water in the whole length of pipe from the top to the heater or the storage tank before hot water is delivered, as is the case with some systems.

Figure 2:
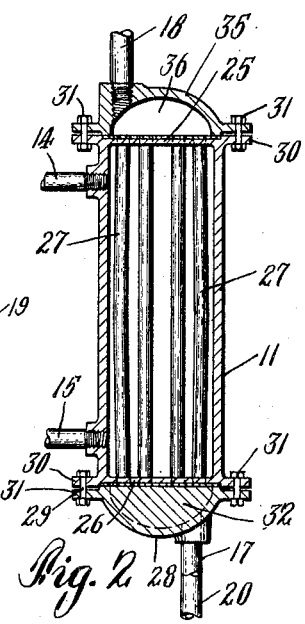
Figs. 2 and 3 are longitudinal sectional views, on planes at right angles to one another, of the form of heating apparatus and accessory connections which I prefer to use in this system.
Figure 3:
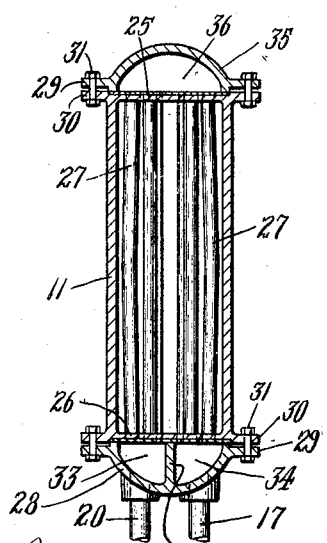
Figure 4:
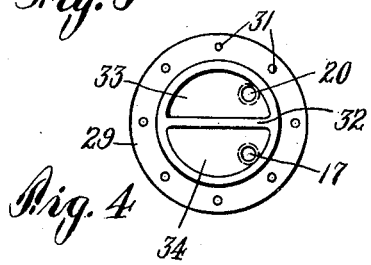
Fig. 4 is a plan view of a preferred form of one of the accessory connections used with the heater.

An important feature of this invention resides in means for controlling the flow of water and compelling a unidirectional flow in each of the circuits above described. Such means is preferably embodied in or applied to the fitting which receives water from the pipes 17 and 20 and conducts it to the heater. I will now describe this preferred means in connection with a detailed description of the form of heater which also I prefer to use. Referring to Figs. 2, 3 and 4, the heater comprises a shell 11, the ends of which are closed by end walls or tube sheets 25 and 26, perforated to receive the ends of conducting tubes 27, and in the perforations of which the ends of such tubes are secured by suitable means. At the inlet end of the heater is secured a recessed fitting or head 28, by means of flanges 29 and 30 and bolts 31. In the recessed interior of this fitting is a partition 32 extending preferably from the outer walls thereof to the wall or tube sheet 26 of the heater and dividing the interior space of the fitting 28 into two distinct chambers 33 and 34. Into one of these chambers the pipe 17 leads and into the other the pipe 20 leads, these pipes being coupled to the fitting in any known or other suitable manner.

At the other or outlet end of the heater is another fitting or head 35, secured in a similar manner, or otherwise suitably, and recessed to provide a single chamber 36 into which all of the conducting pipes 27 open and from which the pipe 18 leads.

It will now be apparent that the streams coming to the heater through the pipes 17 and 20 are separately delivered into the heater, one flowing through the chamber 34 into a portion of the tubes of the heater, and the other through the chamber 33 into the rest of the tubes. They do not mix until they have passed through the heater and come into the chamber 36, and by that time the water has become heated and its density diminished to such an extent that it tends to flow upward through the pipe 18 to the tank and the circulating pipe 19. The water from the return connection 20 flows as freely into the heater as that from the connection 17 notwithstanding that it may be at a much higher temperature. That is, the water in the faucet-supplying line is not caused to stagnate and is not excluded from the heater by colder and denser water coming from the tank return line 17, as would be the case if the water from the two return connections were allowed to mix before passing into the heater. Not only is the water in both circuits thus caused to flow continuously when none is being drawn off from the taps, but when water is being drawn in quantities less than the capacity of the pipe 19 leading from the tank, the flow normally tends to take place in the same direction. In case the number of faucets opened at the same time provides outlet capacity greater than the capacity of the circulating pipe for flow in the normal direction, and particularly if some of the open faucets are so near the return connection that the path of least resistance is through the return connection, then the water may flow in two paths; part going in the normal direction to the circulating pipe from the top of the tank, and part going to it in the reverse flow direction from the tank, viz, through the connection 18, heater 11 and return connection 20, but also coming from the top portion of the tank where the heated water is stored. Whenever such reverse flow occurs, from whatever cause, the obstruction 32 prevents cold water from entering the circulating line through return connection 17 from the tank. Only water which has passed through the heater and been heated can pass to the faucets. The best practice, however, is to make the pipe line 19 large enough to supply all the taps by unidirectional flow in the normal direction, and in that case, the prevention of direct flow of water between pipes 17 and 20 causes the path of least resistance to be that through the pipe 18 and supply pipe 19, i. e., the direction of the normal circulation.

These effects are due to the fact that the partition 32, or equivalent partitioning or separating means, causes the streams from the two return connections to flow in the same general direction to the heating region and prevents both a flow of either stream from one return connection to the other, and a mingling of the streams at a point so far in advance of the heating region that the cooler and denser stream would exclude or choke the warmer and lighter stream, all without the use of valves or other movable parts or mechanism.

Figure 6:
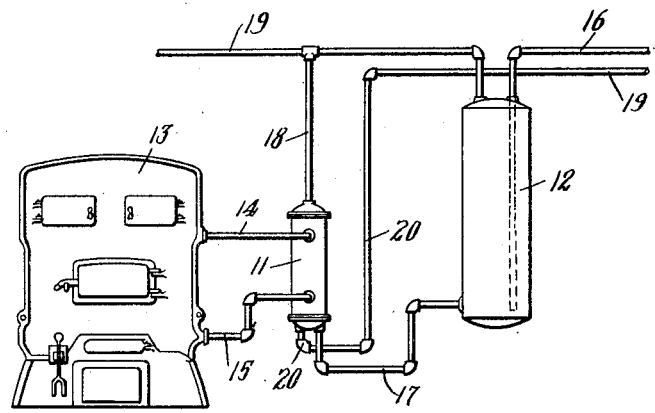
Figs. 6 and 7 are diagrams illustrating alternative equivalent connections of piping to secure the desired results.
Figure 7:
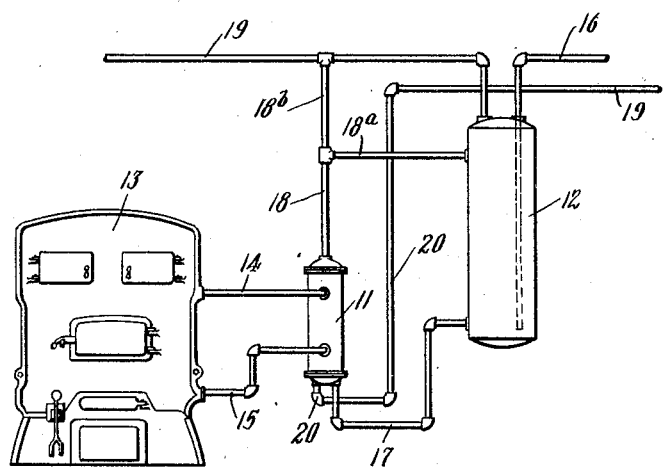

In some situations and installations, where the conditions will not permit the pipe 18 to be led to the storage tank 12, this pipe may be connected directly to some point in the pipe line 19, as shown in Fig. 6; or in other cases where convenience or necessity require, the pipe 18 may have a branch 18$^a$ leading to the storage tank and a branch 18$^b$ leading directly to the line 19, as shown in Fig. 7. Both of these modes of installation are equivalent to that shown in Fig. 1, and have essentially the same effect and result. In each arrangement, including that of Fig. 1 as well as those of Figs. 6 and 7, the heater is connected at its receiving end with both the storage tank and the return pipe 20 of the supply line 19;

and at its discharging end is connected with both the tank and the supply line 19, and the same character of circulation in the hot water supply line and in the tank will take place. Whether the pipe 18 is connected exclusively to the storage tank or exclusively to the line 19, or partly to both, it delivers as much hot water to the line, either directly or indirectly, as will maintain a circulation therein, and the balance of the hot water delivered from the heater will flow into the storage tank, forcing the cold, or cooler, water in the bottom of the tank back to the heater through connection 17. In all cases, those shown in Figs. 1 and 6 as well as that shown in Fig. 7, and in numerous other equivalent arrangements known to plumbers and pipe fitters, flow connections are provided between the heater, the upper part of the tank, and the circulating pipe.

The principles of this invention are not limited in respect to the structure of the heater, or of the fitting 28 or equivalent connections which lead the water from the return pipes to the heater. These parts of the apparatus typify in a broad way means for heating the water and means for leading water by different channels to the heater and hindering a direct flow of water from one to the other of such channels. These means may be embodied in many diverse structures and forms within the scope of my invention and of the protection which I claim. Neither do I claim specifically the structure of heater and adjacent fittings as here illustrated, as such structure is the invention of Elmer S. Stack, shown in his application for United States Patent Serial No. 162,763, filed January 22, 1927, and there claimed by him. My invention resides in the hot water system as a combination, of which a heater and suitable flow controlling or directing means are elements, independently of the precise character of such heater and flow directing means.

Figure 5:
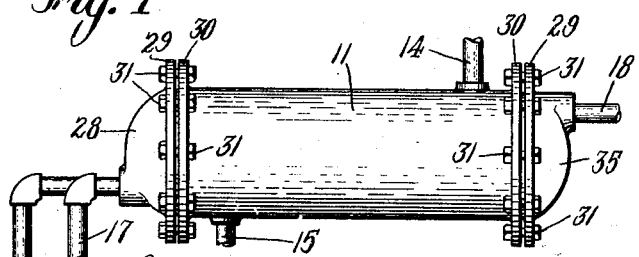
Fig. 5 is an elevation illustrating a possible mode of using the heater and its accessories in a different position from that illustrated in Figs. 2 and 3.

It is to be noted that by connecting the return or inlet pipes to the heater at one side of a longitudinal medial plane and the eduction pipe at the opposite side of such a plane, as illustrated in Fig. 2, the heater and auxiliary fittings or connections may be mounted and operated in a horizontal position, as shown in Fig. 5, with substantially the same effects and results as previously described. The same thing is true as to other forms and constructions of heater and connections which may be used in hot water supply systems conforming to this invention.

It is to be noted also that I am not limited as to the means or agent by which water is heated in my system. I have shown as such means the water heated by a coal or oil fire in a house heating boiler or furnace, because this is the preferred, most convenient, and most economical means for the purpose. But broadly any other suitable heating agent or apparatus may be used.

Among the advantages due to this invention are convenience to the user in that hot water is immediately available at any faucet with only such inconsiderable delay as is required to discharge the small amount of water in the short branch from the circulating pipe to the faucet; economy in the use of water, because the amount wasted before hot water appears at the faucet is reduced to the minimum; and economy of heat, because the circulation of water in the pipe system brings water at the maximum temperature up to the junctions of all the branch pipes leading to the various hot water faucets. No occasion exists for drawing off a large quantity of partially heated water and wasting both the water and the heat carried thereby before water at the desired temperature reaches the tap. The loss of heat due to radiation from the circulating pipe is small and amounts only to a few degrees, leaving this small loss as the only amount to be made up by abstraction of heat from the heat source during the normal continuous circulation of the water. But even the heat so lost from the pipe is not wasted, for it is delivered into the building and reduces by so much the demand on the house heating plant to maintain the building at a prescribed temperature. These effects are secured without the use of any check valves, which in itself is an important advantage, inasmuch as check valves are objectionable and are recognized as such generally by the plumbing art.

What I claim and desire to secure by Letters Patent is:

1. A hot water supply system, comprising a water heater, a storage tank, a circulating pipe for conveying heated water to the points of use, flow connections between the heater, the upper part of the tank and the circulating pipe, separate return connections from the lower part of the tank and from the circulating pipe to the heater, and means for substantially preventing mixture of the different currents from the several return connections prior to their passage through the heater.

2. A hot water supply system, comprising a water heater, a storage tank, a circulating pipe for conveying heated water to the points of use, flow connections between the heater, the upper part of the tank and the circulating pipe, and separate return connections from the lower part of the tank and from the circulating pipe to the heater, including an immovable construction for preventing flow of water from the tank into the return connection of the circulating pipe prior to passage through the heater.

3. A hot water supply system, comprising water heating means, a storage tank, a circulating pipe for conveying heated water to the points of use, flow connections between said heating means, the upper part of the tank and the circulating pipe, separate return connections from the lower part of the tank and from the circulating pipe to the heating means, and provisions for separately directing the water coming from the respective return connections through the heating means, whereby the flow effect in the latter will maintain a circulation through the heating means and circulating pipe at the same time with a circulation between the heating means and tank.

4. A hot water supply system, comprising a water heater having channels for the water to be heated and contiguous spaces for a heating agent, a storage tank, a circulating pipe for conveying heated water to the points of use, flow connections between the heater, the upper part of the tank and the circulating pipe, and separate return connections from the lower part of the tank and from the circulating pipe to the heater, including provisions for separately leading the water from the circulating pipe and tank respectively to different ones of said channels.

5. In a hot water supply system, the combination with a primary heater containing water, of an indirect water heater having channels for water to be heated and contiguous spaces in connection with the water space of the primary heater, a storage tank, a circulating pipe for conveying hot water to the outlets, conducting means for leading hot water from the indirect heater to the tank and circulating pipe, and separate return connections arranged to lead the water separately from the tank and circulating pipe to separate heating channels of the indirect heater.

In testimony whereof I have affixed my signature.

NEILS M. KNUDSEN.